(12) United States Patent
Yoshikane et al.

(10) Patent No.: US 12,109,634 B2
(45) Date of Patent: Oct. 8, 2024

(54) POWER TOOL

(71) Applicant: MAKITA CORPORATION, Anjo (JP)

(72) Inventors: Kiyonobu Yoshikane, Anjo (JP);
Yoshitaka Machida, Anjo (JP); Kazuki Nakagawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 91 days.

(21) Appl. No.: 17/752,360

(22) Filed: May 24, 2022

(65) Prior Publication Data

US 2022/0410282 A1    Dec. 29, 2022

(30) Foreign Application Priority Data

Jun. 25, 2021    (JP) .................................. 2021-105886

(51) Int. Cl.
*B23B 45/02* (2006.01)
*B25F 5/00* (2006.01)
*F16D 55/02* (2006.01)

(52) U.S. Cl.
CPC .............. *B23B 45/02* (2013.01); *B25F 5/008* (2013.01); *F16D 55/025* (2013.01); *B23B 2260/122* (2013.01)

(58) Field of Classification Search
CPC .......... B23B 45/02; B25D 17/00; B25D 16/00
See application file for complete search history.

(56) References Cited

U.S. PATENT DOCUMENTS

| 5,954,457 | A | 9/1999 | Stock et al. | |
| 11,027,389 | B2 * | 6/2021 | Wierer | B25F 5/00 |
| 11,529,725 | B2 * | 12/2022 | Greunke | F16D 27/108 |
| 2021/0234438 | A1 * | 7/2021 | Noguchi | H02K 11/30 |

FOREIGN PATENT DOCUMENTS

JP    4223584 B2    2/2009

* cited by examiner

*Primary Examiner* — Daniel Jeremy Leeds
(74) *Attorney, Agent, or Firm* — Oliff PLC

(57) ABSTRACT

A power tool comprises a motor, a final output shaft, a tool body, a detection device, and a braking device. The motor has a motor body including a stator and a rotor, and a motor shaft extending from the rotor and being rotatable around a first rotational axis. The final output shaft is configured to be rotationally driven around a second rotational axis by torque transmitted from the motor shaft. The tool body houses the motor and the final output shaft. The detection device is configured to detect a locking state of the final output shaft. The braking device is configured to directly act on the motor shaft to brake the motor shaft in response to detection of the locking state.

17 Claims, 10 Drawing Sheets

POWER TOOL

CROSS-REFERENCE TO RELATED APPLICATION

The present application claims priority to Japanese patent application No. 2021-105886 filed on Jun. 25, 2021, the contents of which are hereby fully incorporated herein by reference.

TECHNICAL FIELD

The present disclosure relates to a power tool that is configured to rotationally drive a final output shaft.

BACKGROUND

During operation of a power tool (e.g., a rotary hammer), a final output shaft of the power tool may fall into a non-rotatable state (also referred to as a locking state or a blocking state) due to, for example, jamming or binding of a tool accessory to a workpiece. In such a case, large reaction torque acts on a tool body (housing), so that the tool body may excessively rotate around a rotational axis of the final output shaft. This phenomenon is also called a kickback. For example, Japanese Patent No. 4223584 discloses a drilling tool having a safety device as a countermeasure for the kickback.

SUMMARY

In the above-described safety device, a structural member disposed in the tool body and a structural member disposed on a spindle frictionally engage with each other in response to detection of the locking state, thereby braking the spindle. A rotation speed of the spindle, which serves as the final output shaft, is lower than a rotation speed of a motor. Therefore, the spindle exerts relatively large torque, so that relatively large force is necessary to brake the rotating spindle.

Accordingly, it is a non-limiting object of the present disclosure to provide an improvement in a safety device of a power tool.

One aspect of the present disclosure provides a power tool that includes a motor, a final output shaft, a tool body, a detection device, and a braking device. The motor includes a motor body and a motor shaft. The motor body includes a stator and a rotor. The motor shaft extends from the rotor and is rotatable around a first rotational axis. The final output shaft is configured to be rotationally driven around a second rotational axis by torque transmitted from the motor shaft. The tool body houses the motor and the final output shaft. The detection device is configured to detect a locking state of the final output shaft. The braking device is a mechanical braking device. The braking device is configured to directly act on the motor shaft to brake the motor shaft in response to detection of the locking state.

In the power tool of this aspect, when the final output shaft falls into the locking state for some reason, the braking device, which serves as a safety device, brakes the motor shaft to thereby reduce a possibility of excessive rotation of the tool body around the second rotational axis. Further, the braking device is configured to directly act on the motor shaft. Therefore, the braking device can brake the motor shaft to reduce the possibility of the excessive rotation of the tool body with a smaller force than a known braking device that directly acts on the final output shaft.

DESCRIPTION OF EMBODIMENTS

Figure 1:
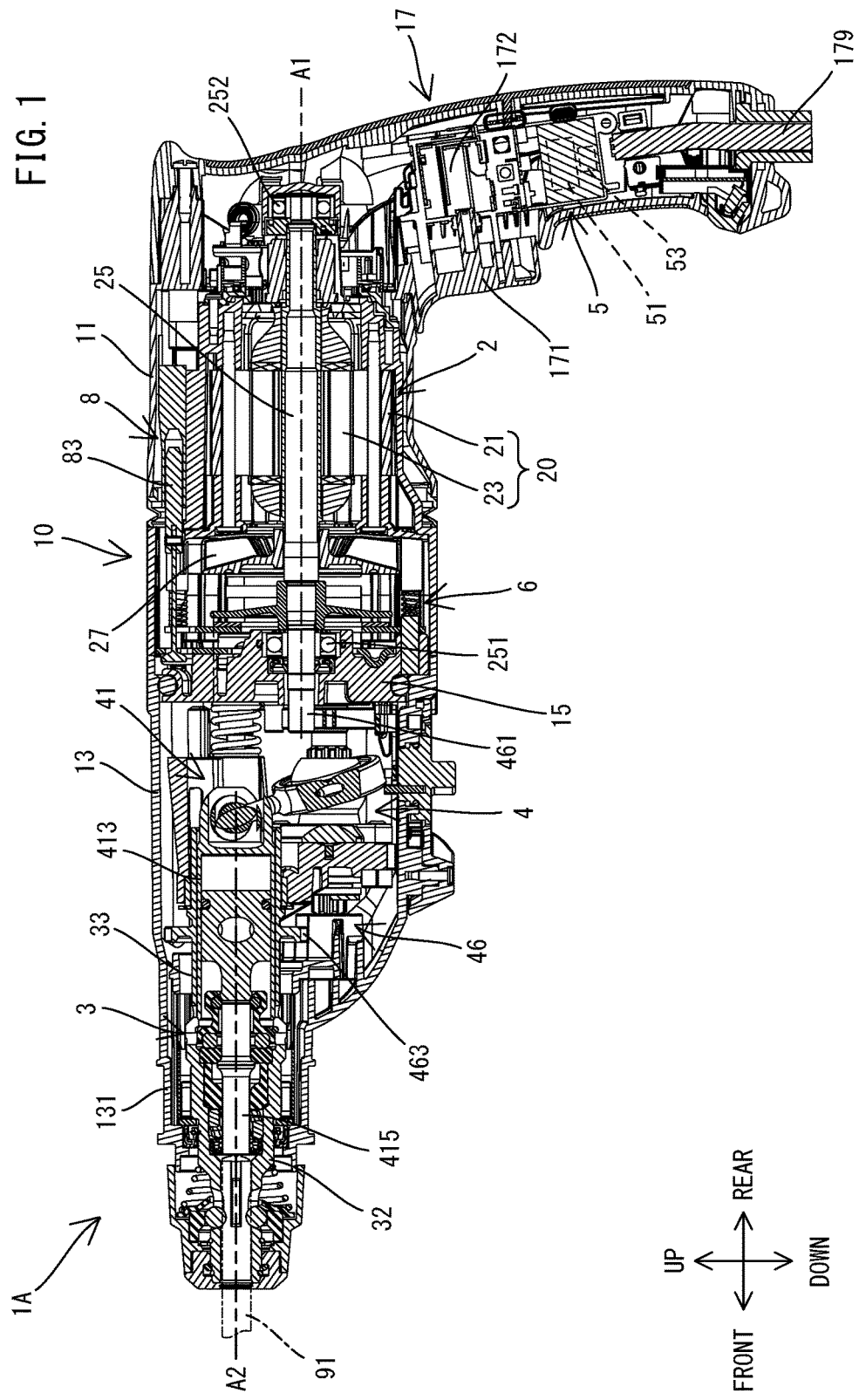
FIG. 1 is a sectional view of a rotary hammer of a first embodiment.
Figure 2:
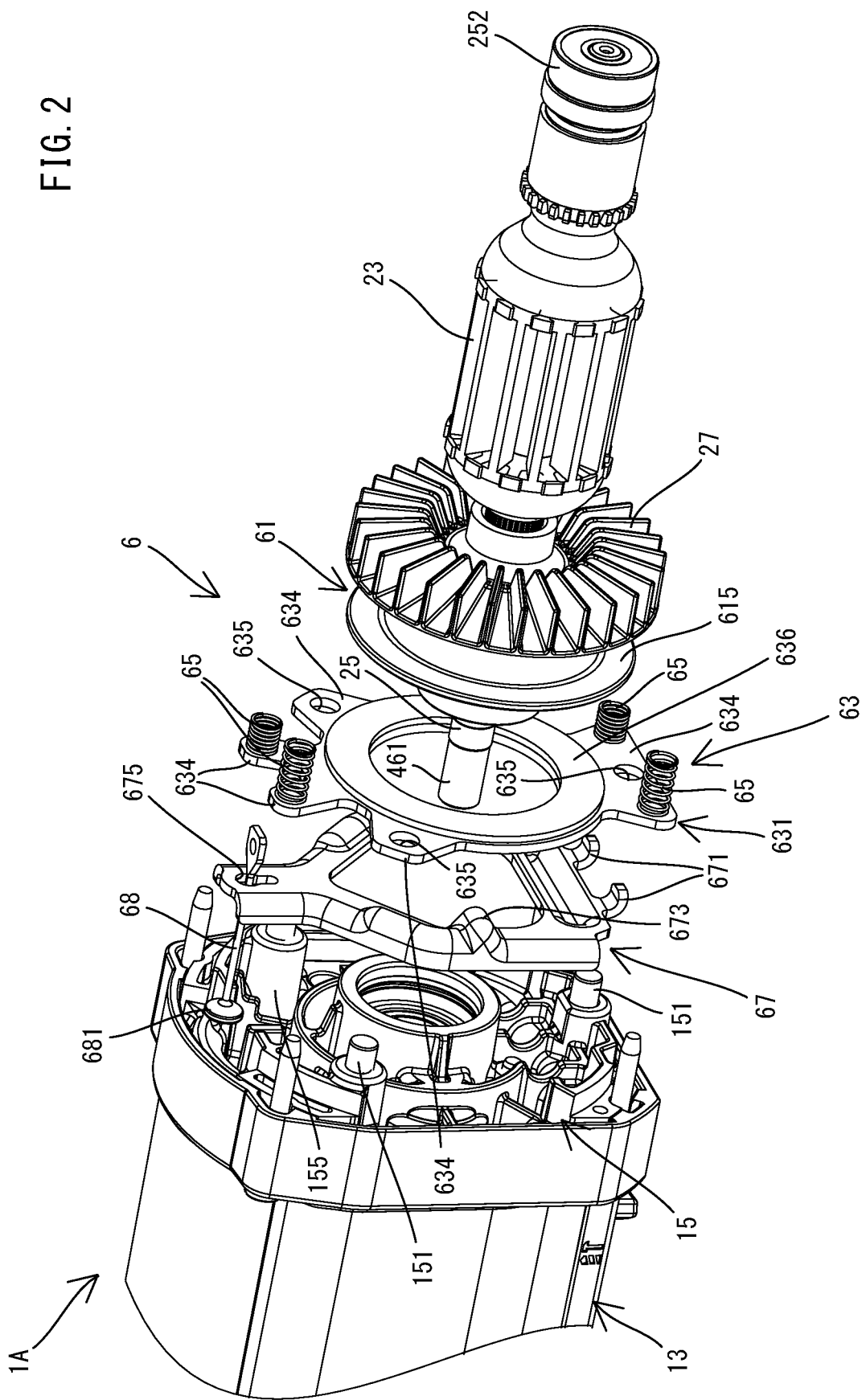
FIG. 2 is a partial exploded perspective view of the rotary hammer.
Figure 3:
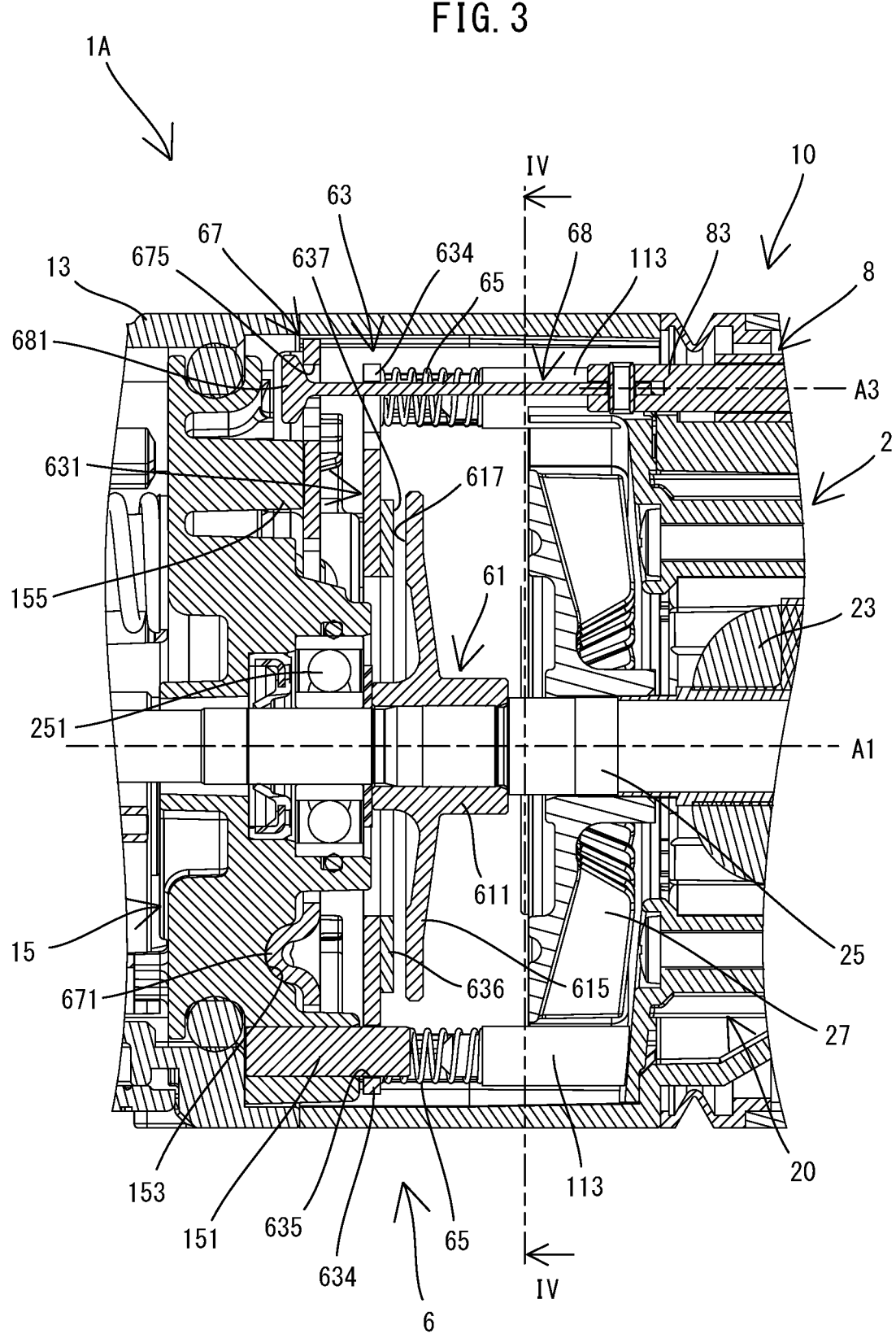
FIG. 3 is a partial, enlarged view of FIG. 1.
Figure 4:
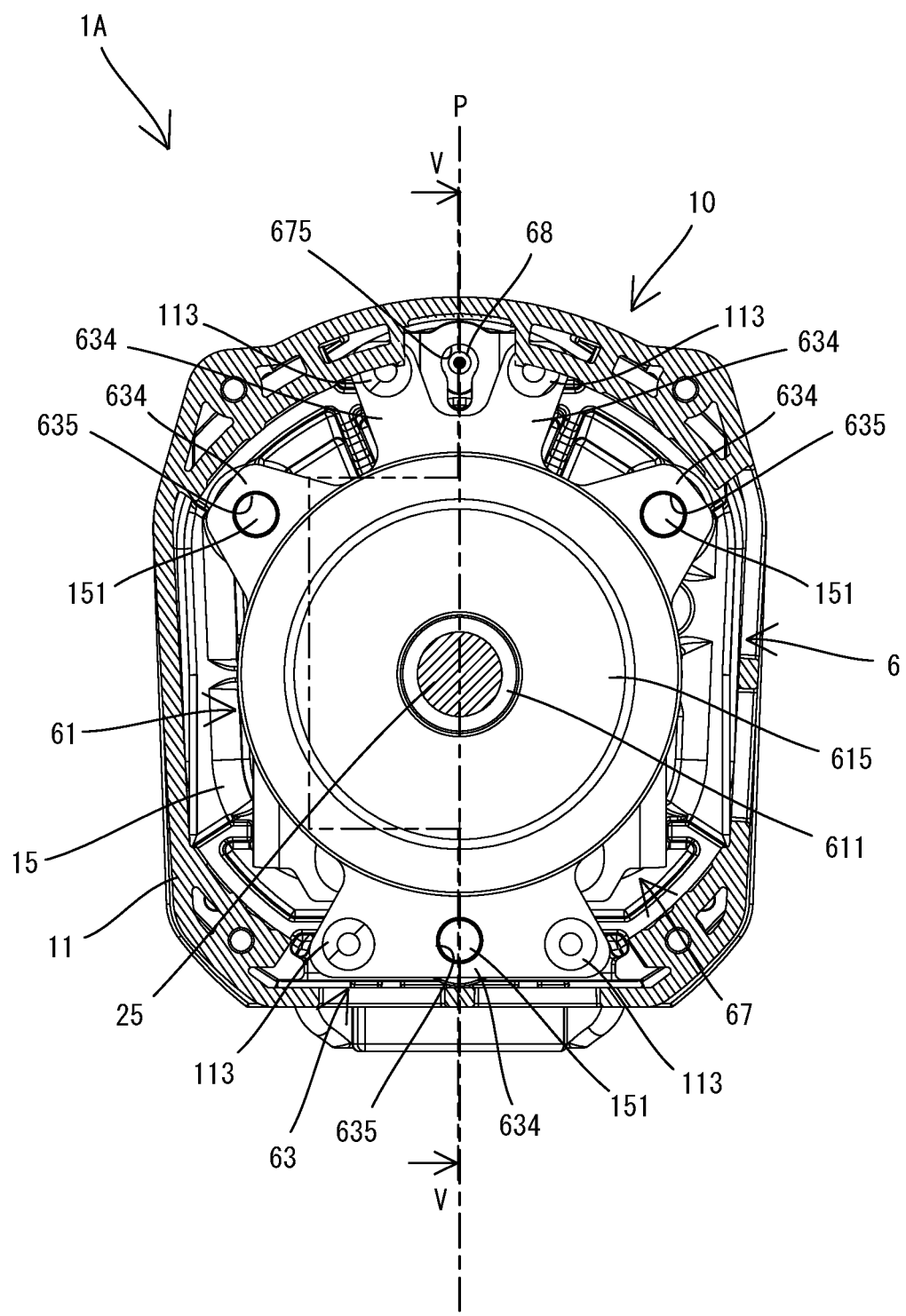
FIG. 4 is a sectional view taken along line IV-IV in FIG. 3.

In one non-limiting embodiment according to the present disclosure, the power tool may further comprise a transmission mechanism that is configured to transmit the torque of the motor shaft to the final output shaft. The braking device may be disposed between the motor and the transmission mechanism in a power transmission path. According to this configuration, the braking device can be disposed relatively close to the motor, so that the braking device can efficiently brake the motor shaft.

In addition or in the alternative to the preceding embodiment, the power tool may further comprise a fan that is disposed between the motor body and the braking device in an extension direction of the first rotational axis. The fan may be configured to rotate integrally with the motor shaft. The fan may be configured to generate an air flow for cooling the motor body and the braking device. According to this configuration, both of the motor body and the braking device can be efficiently cooled.

In addition or in the alternative to the preceding embodiments, the power tool may further comprise a solenoid that is operably coupled to the braking device. The solenoid may be configured to be activated in response to the detection of the locking state to activate the braking device. According to this configuration, the braking device can be quickly activated using the solenoid, which is an electric component that is relatively inexpensive.

In addition or in the alternative to the preceding embodiments, the braking device may comprise a first rotation member that is fixed to the motor shaft such that the first rotation member rotates integrally with the motor shaft. According to this configuration, a rational structure can be achieved that directly acts on and brakes the motor shaft.

In addition or in the alternative to the preceding embodiments, the braking device may further include a brake member, at least one first biasing member, and a pressing member. The brake member may be configured to frictionally engage with the first rotation member to brake the motor shaft. The at least one first biasing member may be configured to bias the brake member away from the first rotation member. The pressing member may be configured to press the brake member against the first rotation member, against biasing force of the at least one first biasing member, in response to the detection of the locking state. According to this configuration, a rational structure can be achieved that brakes the motor shaft by simply moving the pressing member.

In addition or in the alternative to the preceding embodiments, the first rotation member may have a first surface. The brake member may have a second surface that is frictionally engageable with the first surface of the first rotation member. The pressing member may be configured to pivot about (on) a fulcrum to linearly move the brake member relative to the first rotation member in a state in which the first surface and the second surface are in substantially parallel to each other. According to this configuration, the brake member can be linearly moved in response to pivoting movement of the pressing member, so that the first surface and the second surface can effectively contact with each other in a relatively large area.

In addition or in the alternative to the preceding embodiments, the braking device may further include a second rotation member, at least one second biasing member, and a stopper. The second rotation member may be configured to rotate around the first rotational axis in response to rotation of the motor shaft and the first rotation member while frictionally engaging with the first rotation member. The at least one second biasing member may be configured to bias the second rotation member toward the first rotation member to frictionally engage the second rotation member with the first rotation member. The stopper may be configured to be normally held at a first position where the stopper is incapable of interfering with the second rotation member. The stopper may also be configured to move, in response to the detection of the locking state, to a second position where the stopper is capable of interfering with the second rotation member, to stop rotation of the second rotation member. According to this configuration, a rational structure can be achieved that brakes the motor shaft by moving the stopper.

In addition or in the alternative to the preceding embodiments, the at least one second biasing member may comprise at least one disc spring. According to this configuration, at least one second biasing member can be accommodated in a small space while exerting a large load.

In addition or in the alternative to the preceding embodiments, the second rotation member may have a plurality of interference parts arranged at equal intervals in a circumferential direction of the first rotational axis. The stopper may be configured to come into contact with any one of the interference parts to stop the rotation of the second rotation member. According to this configuration, rotating imbalance of the second rotation member can be reduced and the second rotation member can be quickly stopped by the stopper.

In addition or in the alternative to the preceding embodiments, the motor may be a brushed motor. The rotor and the motor shaft of the brushed motor keep rotating due to inertia after energizing of the brushed motor is stopped. Even in such a situation, the braking device can brake the motor shaft and stop the rotation of the motor shaft.

Representative, non-limiting embodiments of the present disclosure are now described in detail with reference to the drawings. Each of the following embodiments exemplarily describes a rotary hammer (also called a hammer drill) as a power tool that is configured to rotationally drive a final output shaft.

First Embodiment

A rotary hammer 1A according to a first embodiment is now described with reference to FIGS. 1 to 6. The rotary hammer 1A is a power tool that is configured to rotationally drive a tool accessory 91 around a driving axis A2 (this action is hereinafter referred to as a rotary action) and to linearly drive the tool accessory 91 along the driving axis A2 (this action is hereinafter referred to as a hammer action). The rotary hammer 1A is an example of a so-called rotary tool and also an example of a power tool having a hammer mechanism.

First, the general structure of the rotary hammer 1A is described with reference to FIG. 1. As shown in FIG. 1, an outer shell of the rotary hammer 1A is mainly formed by a tool body 10 and a handle 17 that is connected to the tool body 10.

The tool body 10 is a hollow body, and may also be referred to as a housing. The tool body 10 houses a spindle 3, a motor 2, a driving mechanism 4, etc. The spindle 3 is an elongate hollow cylindrical member. One end portion of the spindle 3 in its axial direction is configured as a tool holder 32. The tool holder 32 is configured to coaxially and removably hold the tool accessory 91. A longitudinal axis of the spindle 3 defines the driving axis A2 of the tool accessory 91. The tool body 10 extends along the driving axis A2. The tool holder 32 is disposed within one end portion of the tool body 10 in an extension direction of the driving axis A2 (hereinafter simply referred to as a driving-axis direction).

The handle 17 is an elongate hollow body to be gripped by a user. One end portion of the handle 17 in its axial direction is connected to the other end portion of the tool body 10 in the driving-axis direction (i.e. an end portion opposite to the one end portion in which the tool holder 32 is disposed). The handle 17 protrudes from the other end portion of the tool body 10 and extends in a direction intersecting (specifically, generally orthogonal to) the driving axis A2. A power cord 179, which is connectable to the external AC power source, extends from a distal end of the handle 17. The handle 17 has a trigger 171, which is configured to be manually depressed by the user. When the trigger 171 is depressed, the motor 2 is energized and the driving mechanism 4 is driven for the hammer action and/or the rotary action.

The detailed structure of the rotary hammer 1A is now described. For the sake of convenience in the following description, the extension direction of the driving axis A2 (the longitudinal direction of the tool body 10) is defined as a front-rear direction of the rotary hammer 1A. In the front-rear direction, the side on which the tool holder 32 is located is defined as a front side of the rotary hammer 1A, while the opposite side (the side on which the handle 17 is connected to the tool body 10) is defined as a rear side of the rotary hammer 1A. A direction that is orthogonal to the driving axis A2 and that generally corresponds to the longitudinal direction of the handle 17 is defined as an up-down direction of the rotary hammer 1A. In the up-down direction, the side on which a base end of the handle 17 is connected to the tool body 10 is defined as an upper side of the rotary hammer 1A, and the distal end side of the handle 17 is defined as a lower side of the rotary hammer 1A. A direction that is orthogonal to the front-rear direction and the up-down direction is defined as a left-right direction of the rotary hammer 1A.

The detailed structure of the tool body 10 is now described.

As shown in FIG. 1, the tool body 10 has a hollow cylindrical front portion. This cylindrical front portion is referred to as a barrel part 131. A remaining portion of the tool body 10 other than the barrel part 131 has a generally rectangular box-like shape. An inner space of the tool body 10 is partitioned into two spaces by a partition wall 15. The partition wall 15 is disposed within the tool body 10 such that the driving axis A2 intersects the partition wall 15. In this embodiment, the partition wall 15 is fitted within an inner periphery of the tool body 10 and is thus fixedly held by the tool body 10. The partition wall 15 is thus substantially immovable relative to the tool body 10. Alternatively, the partition wall 15 may be formed integrally with the tool body 10 (i.e., the partition wall 15 may form a portion of the tool body 10).

The motor 2 is housed in a rear space behind (rearward of) the partition wall 15. The spindle 3 and the driving mechanism 4 are housed in a front space in front of (frontward of) the partition wall 15. In the following description, a portion of the tool body 10 corresponding to the space behind the partition wall 15 (i.e., a housing space for the motor 2) is referred to as a rear housing part 11. A portion (including the barrel part 131) of the tool body 10 corresponding to the space in front of the partition wall 15 (i.e., a housing space for the spindle 3 and the driving mechanism 4) is referred to as a front housing part 13. The spindle 3 and the driving mechanism 4 basically need lubrication, and thus a lubricant (for example, grease) is provided in the front housing part 13. The partition wall 15 substantially isolates an inner space of the rear housing part 11 (the housing space for the motor 2) from the lubricant. The partition wall 15 also functions as a support for bearings for various shafts, as will be described in detail later.

The structures (elements, components) disposed within the tool body 10 are now described.

As shown in FIG. 1, a fan 27, a braking device 6 and a solenoid 8 are disposed, in addition to the motor 2, within the rear housing part 11. As described above, the spindle 3 and the driving mechanism 4 are disposed within the front housing part 13. These elements are described below.

The motor 2 of this embodiment is a brushed motor. The motor 2 is driven by electric power supplied from the external AC power source. As shown in FIG. 1, the motor 2 includes a motor body 20 and a motor shaft 25. The motor body 20 includes a stator 21 that is fixed to the tool body 10, and a rotor 23 disposed radially inside the stator 21. The motor shaft 25 extends from the rotor 23 and integrally rotates with the rotor 23. In this embodiment, a rotational axis A1 of the motor shaft 25 extends in parallel to the driving axis A2, directly below the driving axis A2. An imaginary plane P that contains the driving axis A2 and the rotational axis A1 passes a substantial center of the rotary hammer 1A in the left-right direction and extends in the up-down direction.

The motor shaft 25 is supported by two bearings 251, 252 to be rotatable relative to the tool body 10 around the rotational axis A1. The front-side bearing 251 is supported by the partition wall 15. The rear-side bearing 252 is supported by a rear portion of the tool body 10 (specifically, a motor housing that houses the motor body 10 within the rear housing part 11). A front end portion of the motor shaft 25 extends through the partition wall 15 and into the front housing part 13. A driving gear 461 is fixed around the front end portion of the motor shaft 25 extending into the front housing part 13.

The fan 27 is fixed around a portion of the motor shaft 25 between the motor body 20 and the front-side bearing 251 (or the partition wall 15). More specifically, the fan 27 is in front of and adjacent to the motor body 20. The fan 27 rotates integrally with the motor shaft 25 to thereby generate an air flow for cooling the motor 2.

The braking device 6 is disposed between the motor 2 and the driving mechanism 4 in a power transmission path. More specifically, the braking device 6 is between the motor body 20 and the bearing 251 in the extension direction of the motor shaft 25 (i.e., the front-rear direction). Further more specifically, the braking device 6 is between the fan 27 and the bearing 251 (the partition wall 15). Thus, the braking device 6 and motor body 20 are on opposite sides of the fan 27 in the extension direction of the motor shaft 25. Although not shown in detail, in this embodiment, inlet openings are formed in a rear portion of the tool body 10 (the rear housing part 11), and discharge openings are formed around the braking device 6. Thus, in response to rotation of the fan 27, air flows into the tool body 10 through the inlet openings, flows forward within the rear housing part 11, cools the motor 2 and the braking device 6, and then flows out through the discharge openings. In this manner, in this embodiment, the elements (components) are arranged such that the motor 2 and the braking device 6 can be efficiently cooled.

The braking device 6 is activated by the solenoid 8 to brake the motor shaft 25 when the spindle 3 falls into a state in which the spindle 3 cannot rotate (also referred to as a locking state or blocking state) for some reason. The solenoid 8 is above the motor 2 within the rear housing part 11. The braking device 6 and the solenoid 8 will be described in detail later.

The spindle 3 serves as a final output shaft of the rotary hammer 1A. As shown in FIG. 1, the spindle 3 is within the front housing part 13 and supported to be rotatable relative to the tool body 10 around the driving axis A2. A front half of the spindle 3 serves as the tool holder 32. The tool accessory 91 is inserted into a front portion of the tool holder 32 such that the longitudinal axis of the tool accessory 91 coincides with the driving axis A2. The tool accessory 91 is held by the tool holder 32 such that the tool accessory 91 is movable in its axial direction relative to the tool holder 32, but not rotatable around its axis relative to the tool holder 32. A rear half of the spindle 3 serves as a cylinder 33 that slidably holds a piston 413, which will be described later.

The driving mechanism 4 is operably coupled to the motor 2 (specifically, to the motor shaft 25). The driving mechanism 4 is configured to drive the tool accessory 91 using power of the motor 2. The driving mechanism 4 of this embodiment includes a striking mechanism 41 for the hammer action, and a rotation transmitting mechanism 46 for the rotary action. The striking mechanism 41 is configured to convert rotation of the motor shaft 25 into a linear motion and transmit the linear motion to a striking element, to thereby linearly drive the tool accessory 91 along the driving axis A2. The rotation transmitting mechanism 46 is configured to transmit torque of the motor shaft 25 to the spindle 3, to thereby rotationally drive the tool accessory 91 around the driving axis A2.

Although not shown and described in detail, in this embodiment, in the striking mechanism 41, an oscillating member that oscillates in the front-rear direction in response to the rotation of the motor shaft 25 reciprocates the piston 413 along the driving axis A2 within the cylinder 33. An impact bolt 415 strikes the tool accessory 91 according to reciprocating movement of the piston 413, to thereby linearly drive the tool accessory 91. The rotation transmitting mechanism 46 includes the driving gear 461 on the motor shaft 25, a driven gear 463 fixed around the cylinder 33, and a gear train operably coupled to the driving gear 461 and the driven gear 463. The rotation transmitting mechanism 46 is configured to rotate the spindle 3 (the tool holder 32) in response to the rotation of the motor shaft 25. It is noted, however, that any known structure(s) that is (are) different from the above-described example may be employed in each of the striking mechanism 41 and the rotation transmitting mechanism 46.

In this embodiment, the rotary hammer 1A has three action modes of (i) a hammer mode (hammering only mode), in which only the hammer action is performed, (ii) a rotary mode (rotation only mode), in which only the rotary action is performed, and (iii) a rotary hammer mode (hammering with rotation mode), in which both the hammer action and the rotary action are performed at the same time. Although not shown and described in detail, the driving mechanism 4 operates in accordance with an action mode selected by the user from the above-described three action modes via a manually operable member.

The structures (elements, components) disposed within the handle 17 are now described.

The trigger 171 is disposed on an upper portion of the handle 17. A switch 172 is disposed behind the trigger 171 within the handle 17. The switch 172 is normally kept OFF and is turned ON in response to depressing of the trigger 171.

A controller (a control unit) 5 is disposed below the switch 172 within the handle 17. Although not shown in detail, the controller 5 includes a control circuit 51 and an acceleration sensor 53, which are mounted on a circuit board. The acceleration sensor 53 is configured to output a signal that indicates a detected acceleration, to the control circuit 51.

The controller 5 is electrically connected to the switch 172 and to the solenoid 8 via wires, which are not shown. In this embodiment, the control circuit 51 of the controller 5 is configured to drive the motor 2 when the switch 172 is ON. The control circuit 51 is configured to activate (actuate) the solenoid 8 and thus cause the braking device 6 to operate according to the detection result of the acceleration sensor 53, as will be described in detail later.

The braking device 6 is now described in detail.

As shown in FIGS. 2 to 5, the braking device 6 includes a brake rotor 61, a brake member 63, biasing members 65, and a pressing member 67.

The brake rotor 61 is fixed to the motor shaft 25 between the fan 27 and the bearing 251. The brake rotor 61 is configured to rotate integrally with the motor shaft 25 around the rotational axis A1. The brake rotor 61 includes a sleeve 611 fixed around the motor shaft 25, and a disc part 615 extending radially outward from the sleeve 611. A front surface 617 of an annular outer circumferential portion of the disc part 615 is substantially orthogonal to a straight line extending in the front-rear direction. The brake rotor 61 of this embodiment is made of metal (for example, iron).

The brake member 63 is in front of the brake rotor 61 (specifically, between the brake rotor 61 and the bearing 251). The brake member 63 is linearly movable in the front-rear direction relative to the motor shaft 25 and to the brake rotor 61. The brake member 63 of this embodiment is basically an annular member, which has an opening at its center The brake member 63 is disposed around (encircles) the motor shaft 25. The brake member 63 is configured to brake the motor shaft 25 by frictionally engaging with the brake rotor 61. The brake member 63 includes a receiving plate 631 and a friction material 636.

The receiving plate 631 includes an annular center portion and a plurality of protrusions (projections) 634 each protruding radially outward from the annular center portion. The protrusions 634 are spaced apart from each other in a circumferential direction around the rotational axis A1. Three of the protrusions 634 (specifically, lower, upper-left and upper-right protrusions 634) each have a guide hole 635. Three guide pins 151 are fixed on the partition wall 15 and protrude rearward, corresponding to the guide holes 635. Since the partition wall 15 is substantially immovable relative to the tool body 10, the guide pins 151 can be regarded as being fixed to the tool body 10. The guide pins 151 are slidably inserted into the guide holes 635, respectively. Thus, the guide pins 151 can stably guide movement of the brake member 63 in the front-rear direction relative to the motor shaft 25 and the brake rotor 61. The receiving plate 631 is made of metal (for example, iron).

The friction material 636 has an annular shape. More specifically, the friction material 636 has a shape that substantially matches that of the outer circumferential portion of the brake rotor 61. The friction material 636 is fixed to a rear surface of the center portion of the receiving plate 631. A rear surface 637 of the friction material 636 of the brake member 63 extends substantially parallel to the front surface 617 of the brake rotor 61 and faces the front surface 617. The rear surface 637 is a friction surface that is frictionally engageable with the front surface 617 of the brake rotor 61. In place of the above-described structure, the brake member 63 may be a single member an entirety of which is made of metal (for example, iron) and the rear surface thereof may be frictionally engageable with the front surface 617 of the brake rotor 61.

The biasing members 65 are configured to bias the brake member 63 away from the brake rotor 61 (i.e., toward the front). In this embodiment, the number of the biasing members 65 is four. The biasing members 65 are spaced apart from each other in the circumferential direction around the rotational axis A1. More specifically, two of the biasing members 65 are on the left side of the above-described plane P (see FIG. 4) and the remaining two biasing members 65 are on the right side of the plane P. The biasing members 65 are arranged substantially symmetrically about (across) the plane P. Further, two of the biasing members 65 are above the rotational axis A1 and the other two biasing members 65 are below the rotational axis A1. In this embodiment, a compression coil spring is employed as each of the biasing members 65. Each of the biasing members 65 is disposed between the tool body 10 (a spring receiver 113 of the rear housing part 11) and the brake member 63 (the protrusion 634) in a compressed manner, so that the biasing members 65 always bias the brake member 63 forward relative to the tool body 10.

The pressing member 67 is operably coupled to the solenoid 8, which will be described below. The pressing member 67 is configured to move (specifically, pivot) in response to activation of the solenoid 8 to press the brake member 63 against the brake rotor 61, against the biasing force of the biasing members 65. The pressing member 67 of this embodiment is a frame-like member having a generally home-plate-shape (a pentagon) that has a substantially symmetrical shape relative to the plane P. The pressing member 67 is made of metal.

The pressing member 67 has two fulcrum (pivot) protrusions 671, two pressing protrusions 673, and an engagement hole 675.

Each of the fulcrum protrusions 671 protrudes forward. A sectional shape of the fulcrum protrusion 671 in a section orthogonal to the left-right direction is generally semicircular. The two fulcrum protrusions 671 are on a lower portion of the pressing member 67 and spaced apart from each other in the left-right direction. The fulcrum protrusions 671 are arranged substantially symmetrically about the plane P.

Each of the pressing protrusions 673 protrudes rearward. The two pressing protrusions 673 are each on a generally center portion in the up-down direction of the pressing member 67 (at positions overlapping with the rotational axis A1 in a side view) and paced apart from each other in the left-right direction. The pressing protrusions 673 are arranged substantially symmetrically about the plane P.

The engagement hole 675 penetrates an upper portion of the pressing member 67 in the front-rear direction. An elongate connection member 68 is inserted into the engagement hole 675 and extends in the front-rear direction. The connection member 68 is a rod-like member. A disc-shaped head 681, which has a diameter larger than the engagement hole 675, is fixed onto a front portion of the connection member 68. The connection member 68 is inserted into the engagement hole 675 such that the head 681 is frontward of the pressing member 67. A rear end portion of the connection member 68 is connected to a plunger 83 of the solenoid 8.

Figure 5:
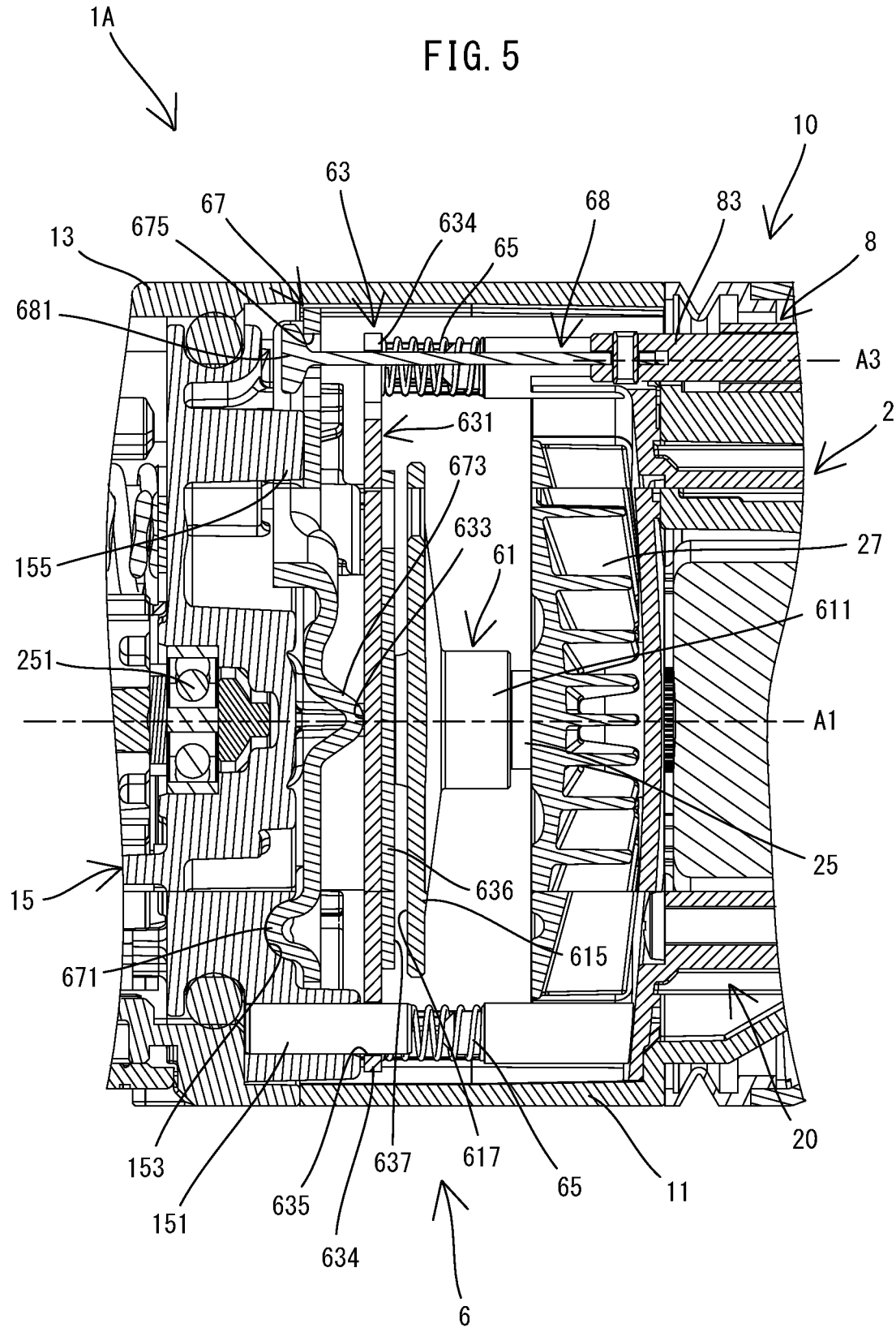
FIG. 5 is a sectional view taken along line V-V in FIG. 4, showing an initial state, in which a braking device is not activated.

The pressing member 67 is disposed between the brake member 63 and the partition wall 15 in the front-rear direction. The pressing member 67 is pivotable in the front-rear direction. More specifically, as shown in FIG. 5, two recesses 153 are formed in a lower portion of the partition wall 15. The recesses 153 are spaced apart from each other in the left-right direction. Each of the recesses 153 has a semicircular section that matches the fulcrum protrusion 671. The fulcrum protrusions 671 respectively engage with the recesses 153. Owing to such a configuration, the pressing member 67 is pivotable in the front-rear direction relative to the tool body 10 and the brake member 63, using the two fulcrum protrusions 671 serving as fulcrums (pivot points). The pressing member 671 is thus pivotable in the front-rear direction about an axis extending in the left-right direction. The two pressing protrusions 673 each face the brake member 63 in the front-rear direction. More specifically, the two pressing protrusions 673 face a left center portion and a right center portion of the receiving plate 631, respectively.

As described above, the biasing members 65 always bias the brake member 63 forward, and thus the pressing member 67 is also biased forward via the brake member 63. Accordingly, as shown in FIG. 5, the pressing member 67 is normally held at a position (an initial position) where the upper portion of the pressing member 67 (a portion below the engagement hole 57) abuts on a stopper 155, which is formed on the partition wall 15, from behind.

The brake member 63 is held at a position where a front surface 633 of the center portion of the receiving plate 631 abuts on the pressing protrusions 673 of the pressing member 67 from behind. The pressing protrusions 673 are arranged symmetrically about the plane P and each abut (contact) the brake member 63 at the center portion in the up-down direction of the brake member 63. At this position, a rear surface (friction surface) 637 of the friction material 636 of the brake member 63 is spaced apart forward from the front surface 617 of the outer circumferential portion of the brake rotor 61. The position of the brake member 63 (the position shown in FIG. 5) when the pressing member 67 is at the initial position (when the rear surface 637 is spaced apart from the front surface 617) is also referred to as a spaced-apart position.

The solenoid 8 is now described in detail.

As shown in FIGS. 1 and 5, the solenoid 8 is disposed radially outward of the motor body 20 within the tool body 10. More specifically, the solenoid 8 is directly above the motor body 20 within the rear housing part 11. In this embodiment, the rotational axis A1 of the motor shaft 25 is below the driving axis A2, and thus a space is formed directly above the motor body 20 within the rear housing part 11. This space is effectively utilized to accommodate the solenoid 8.

The solenoid 8 is a well-known electric component that is configured to convert electrical energy into mechanical energy for linear motion by using a magnetic field that is generated in response to energizing a coil. The solenoid may also be referred to as a solenoid actuator, a linear solenoid, etc.

Although not shown in detail, the solenoid 8 includes a frame, a coil housed in the frame, and the plunger 83 that is linearly movable in response to the energizing of the coil. The solenoid 8 is disposed such that a moving axis A3 of the plunger 83 extends substantially parallel to the rotational axis A1 (i.e., in the front-rear direction). Owing to this arrangement, the above-described space directly above the motor body 20 is utilized most efficiently. A front portion of the plunger 83 extends forward from the frame, and is connected to the rear portion of the connection member 68. Thus, the plunger 83 and the pressing member 67 are operably coupled to each other via the connection member 68.

Figure 6:
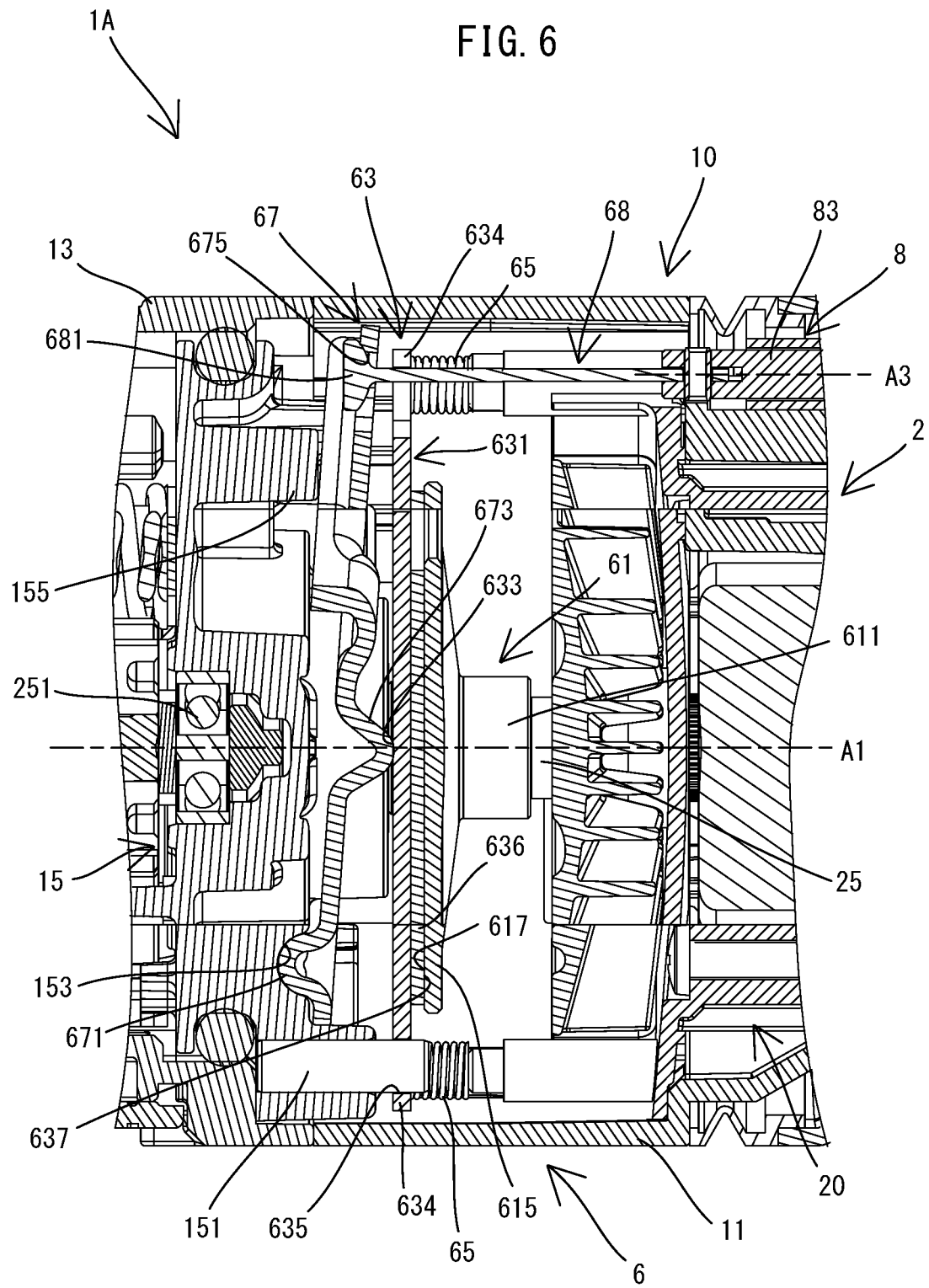
FIG. 6 is a sectional view, which corresponds to FIG. 5, showing a braking state, in which the braking device is activated.

In this embodiment, the solenoid 8 is a so-called pull-type solenoid, and the plunger 83 is normally at its foremost (most-protruding) position (a position shown in FIG. 5). As shown in FIG. 6, when the coil is energized, the plunger 83 linearly moves rearward along the moving axis A3 and the connection member 68 also linearly moves rearward together with the plunger 83.

When the plunger 83 moves rearward, the plunger 83 pulls the upper portion of the pressing member 67 rearward via the head 681 on the front portion of the connection member 68. Thus, the pressing member 67 pivots rearward from the initial position (in a clockwise direction when seen from the left side) about (on) the fulcrum protrusions 671 against the biasing force of the biasing members 65. When the pressing member 67 pivots with the pressing protrusions 673 abutting on the brake member 63, the pressing member 67 moves the brake member 63 rearward and presses the brake member 63 against the brake rotor 61. The position of the pressing member 67 at this time (the position shown in FIG. 6) may also be referred to as a pressing position.

In response to the pivoting movement of the pressing member 67, the brake member 63 is linearly moved rearward, while being guided by the guide pins 151. The rear surface 637 of the friction material 636 is maintained substantially parallel to the front surface 617 of the brake rotor 61 while the brake member 63 linearly is moved rearward. Owing to the above-described arrangement of the biasing members 65 and the pressing protrusions 673, the pressing member 67 can press and move the brake member 63 with good balance while pivoting against the biasing force of the biasing members 65.

When the brake member 63 is pressed against the brake rotor 61, the rear surface 637 of the brake member 63 abuts on (makes physical contact with) and frictionally engages with the front surface 617 of the brake rotor 61, so that the brake member 63 brakes the motor shaft 25 via the brake rotor 61. The frictional engagement here refers to engagement between components due to frictional force, including slipping engagement between components. The position of the brake member 63 (the position shown in FIG. 6) that causes the rear surface 637 of the brake member 63 to frictionally engage with the front surface 617 of the brake rotor 61 may alco be referred to as an abutting position (or contact position).

The operation of the rotary hammer 1A is now described.

As described above, when the trigger 171 is manually depressed and thus the switch 172 is turned ON, the control circuit 51 of the controller 5 energizes the motor 2 to start driving of the motor 2. The driving mechanism 4 is driven according to the selected action mode.

The control circuit 51 determines whether or not the spindle 3 is in the locking state while driving the motor 2, based on the acceleration detected by the acceleration sensor 53 (specifically, based on the signal from the acceleration sensor 53). The acceleration detected by the acceleration sensor 53 is a physical quantity (parameter or indicator) that indicates a rotating state of the tool body 10 around the driving axis A2 and thus the locking state of the spindle 3. Any known method can be employed for determining whether or not the spindle 3 is in the locking state. For example, it may be determined that the spindle 3 is in the locking state when the detected acceleration or a value calculated from the acceleration (for example, an angular acceleration) exceeds a specified threshold.

When the control circuit 51 determines that the spindle 3 is in the locking state (i.e., when the control circuit 51 detects the locking state), the control circuit 51 stops energizing the motor 2, namely, stops driving the motor 2. In addition, the control circuit 51 activates the solenoid 8 at substantially the same time as the control circuit 51 stops energizing the motor 2 (or immediately before or immediately after the control circuit 51 stops energizing) so as to activate the braking device 6. As described above, the plunger 83 and the connection member 68 are pulled rearward and thus the brake member 63 is moved by the pressing member 67 from the spaced-apart position to the abutting position (see FIG. 6).

The rotor 23 and the motor shaft 25 of the motor 2 tend to keep rotating due to inertia even after the energizing of the motor 2 is stopped. To cope with this, the brake member 63 located at the abutting position frictionally engages with the brake rotor 61 and brakes the motor shaft 25 of the motor 2. The brake rotor 61 rotates together with the motor shaft 25 while its rotation speed is reduced owing to its slip engagement with the brake member 63, and then stops rotating. The driving mechanism 4 stops its operation when the motor shaft 25 stops rotating. Since the motor 2 in this embodiment is a brushed motor, it is more difficult to electrically brake the motor 2 compared to a brushless motor. Thus, in this embodiment, by employing the mechanical braking device 6, rotation of the motor shaft 25 can be quickly stopped after energization of the motor 2 is stopped.

Thereafter, when depressing manipulation of the trigger 171 is cancelled and thus the switch 172 is turned OFF, the control circuit 51 stops energizing the solenoid 8. Alternatively, the control circuit 51 may stop energizing the solenoid 8 after a specified time has elapsed since the activation of the solenoid 8. Accordingly, the plunger 83 returns to its foremost position. When the plunger 83 returns to the foremost position, the brake member 63 returns to the spaced-apart position from the abutting position and the pressing member 67 returns to the initial position from the pressing position, owing to the biasing force of the biasing members 65 (see FIG. 5).

As described above, in this embodiment, when the spindle 3, which serves as the final output shaft of the rotary hammer 1A, falls into the locking state for some reason, the braking device 6, which serves as a safety device, directly acts on and brakes the motor shaft 25. Thus, the possibility of excessive rotation of the tool body 10 around the driving axis A2 due to the reaction torque can be reduced. The braking device 6 is configured to directly act on the motor shaft 25. This braking device 6 can brake the motor shaft 25 with smaller force to reduce the possibility of the excessive rotation of the tool body 10, compared to a known braking device that directly acts on the spindle 3.

The braking device 6 is disposed between the motor 2 and the driving mechanism 4 (the rotation transmitting mechanism 46) in the power transmission path. Therefore, the braking device 6 can brake the motor shaft 25 efficiently at a position relatively close to the motor 2. Further, the braking device 6 can be disposed at a position where the braking device 6 is less likely to be affected by the lubricant, compared to a configuration in which the braking device 6 directly acts on the spindle 3. In particular, the braking device 6 of this embodiment is disposed in the space within the rear housing part 11 that is partitioned by the partition wall 15 from the space within the front housing part 13 where the lubricant is present. Thus, the braking device 6 can be securely and easily isolated from the lubricant.

In this embodiment, the solenoid 8, which is operably coupled to the braking device 6 (the pressing member 67), activates the braking device 6 (causes the braking device 6 to operate). More specifically, the control circuit 51 of the controller 5 activates the solenoid 8 in response to the detection of the locking state so as to activate the braking device 6. The solenoid 8 is an electric component that is relatively inexpensive. Thus, a structure that can immediately activate the braking device 6 in response to the detection of the locking state is achieved at a relatively low cost. The solenoid 8, which is an electric component, is also disposed within the rear housing part 11. Therefore, the solenoid 8 can also be protected from the lubricant, and the solenoid 8 and the braking device 6 (the pressing member 67) can be easily coupled to each other. In addition, an entirety of the braking device 6 and the solenoid 8 can be accommodated within a relatively small space.

Further, in this embodiment, the brake rotor 61 and the brake member 63 frictionally engage with each other to thereby brake the motor shaft 25. The brake member 63 is normally at the spaced-apart position due to the biasing force of the biasing members 65. On the other hand, the brake member 63 is moved to the abutting position by the pressing member 67 in response to the detection of the locking state and thus pressed against the brake rotor 61 to frictionally engage with the brake rotor 61. In this embodiment, a rational structure is achieved that can brake the motor shaft 25 by simply moving the pressing member 67 by the solenoid 8 in response to the activation of the solenoid 8. In particular, in this embodiment, the pressing member 67 pivots on the fulcrum protrusions 671 and linearly move the brake member 63. Accordingly, the rear surface 637 of the brake member 63 and the front surface 617 of the brake rotor 61 can abut on each other in a relatively large area.

Correspondences between the features of the first embodiment and the features of the present disclosure are as follows. However, the features of the embodiment are merely exemplary, and do not limit the features of the present disclosure or the present invention.

The rotary hammer 1A is an example of the "power tool". The motor 2, the motor body 20, the stator 21, the rotor 23, and the motor shaft 25 are examples of the "motor", the "motor body", the "stator", the "rotor", and the "motor shaft", respectively. The rotational axis A1 is an example of the "first rotational axis". The spindle 3 (the tool holder 32) is an example of the "final output shaft". The driving axis A2 is an example of the "second rotational axis". The tool body 10 is an example of the "tool body". The controller 5 (the control circuit 51) is an example of the "detection device". The braking device 6 is an example of the "braking device".

The driving mechanism 4 (more specifically, the rotation transmitting mechanism 46) is an example of the "transmission mechanism". The fan 27 is an example of the "fan". The solenoid 8 is an example of the "solenoid". The brake rotor 61 is an example of the "first rotation member". The brake member 63, the biasing member 65, and the pressing member 67 are examples of the "brake member", the "first biasing member", and the "pressing member", respectively. The front surface 617 of the brake rotor 61 is an example of the "first surface of the first rotation member". The rear surface 637 of the brake member 63 is an example of the "second surface of the brake member".

Second Embodiment

A rotary hammer 1B according to a second embodiment is now described with reference to FIGS. 7 to 10. The rotary hammer 1B includes a braking device 7 that is different from the braking device 6 of the rotary hammer 1A according to the first embodiment. Further, a structure for coupling the braking device 7 to the solenoid 8 is different from that of the first embodiment. However, other structures in the rotary hammer 1B are substantially identical to those in the rotary hammer 1A. Therefore, in the following description, structures that are substantially identical to those of the first embodiment are given the same numerals as in the first embodiment and are not or only briefly described, and structures that are different from those of the first embodiment are mainly described.

Figure 7:
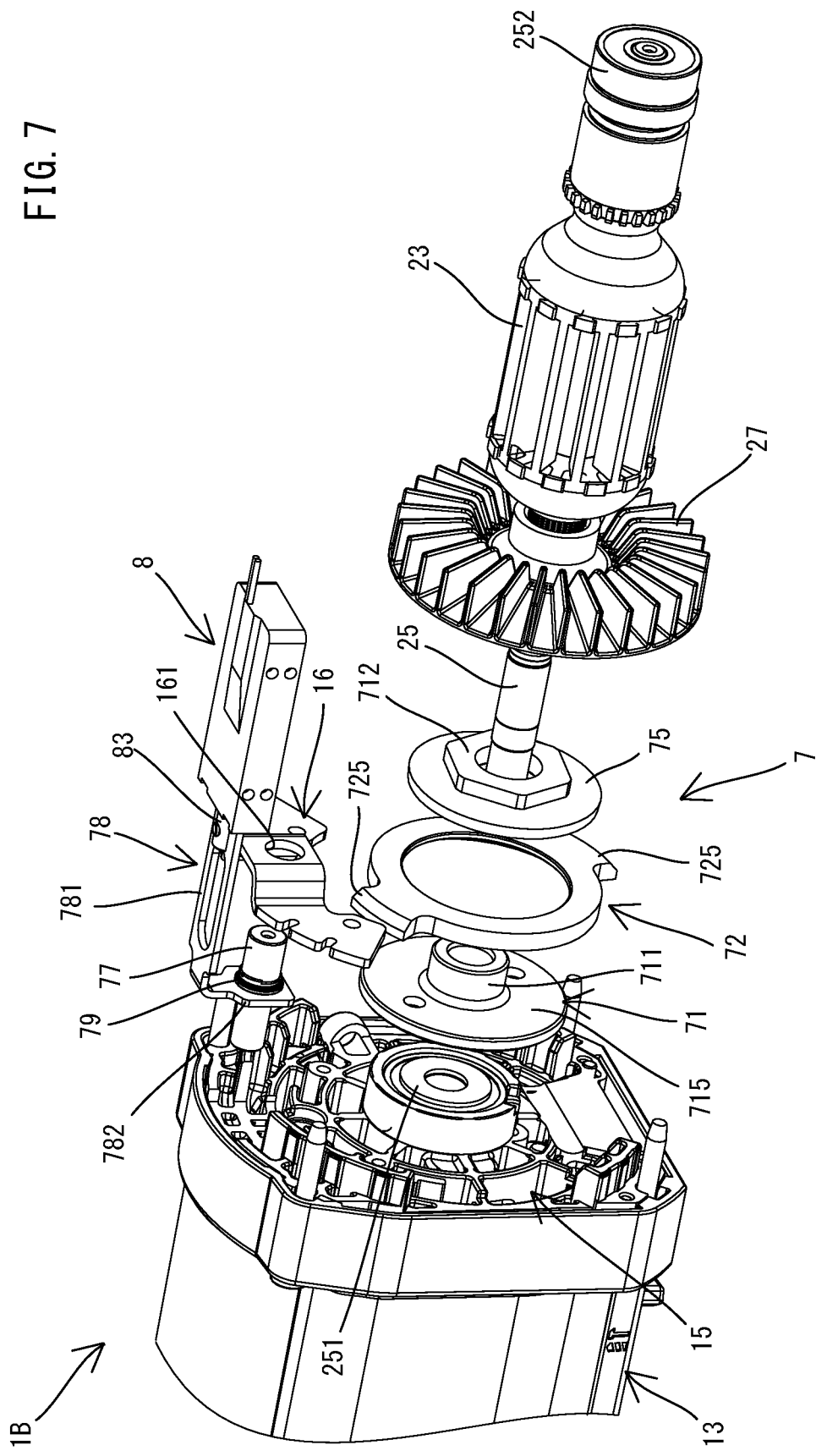
FIG. 7 is a partial exploded perspective view of a rotary hammer of a second embodiment.
Figure 8:
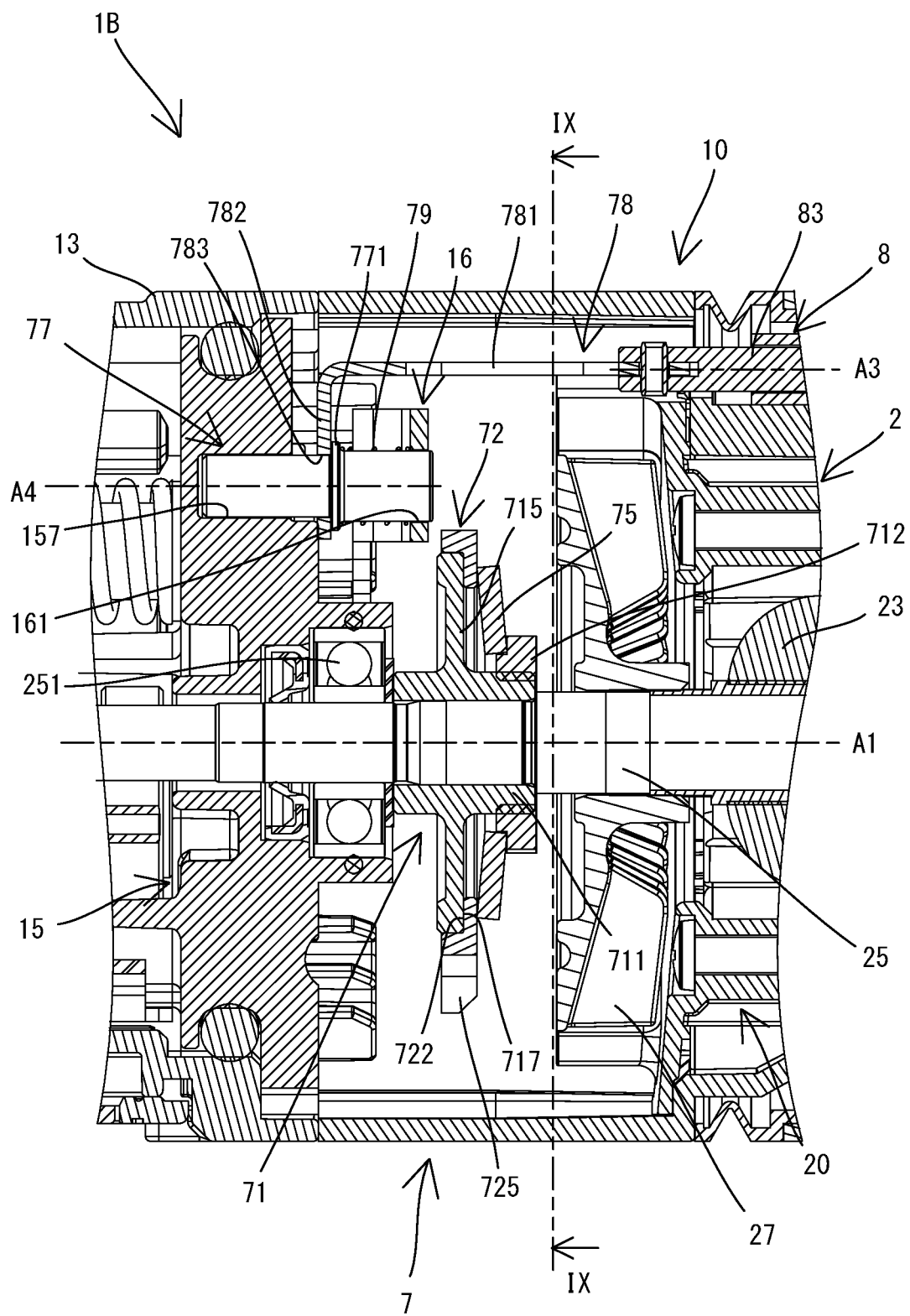
FIG. 8 is a partial, sectional view of the rotary hammer.
Figure 9:
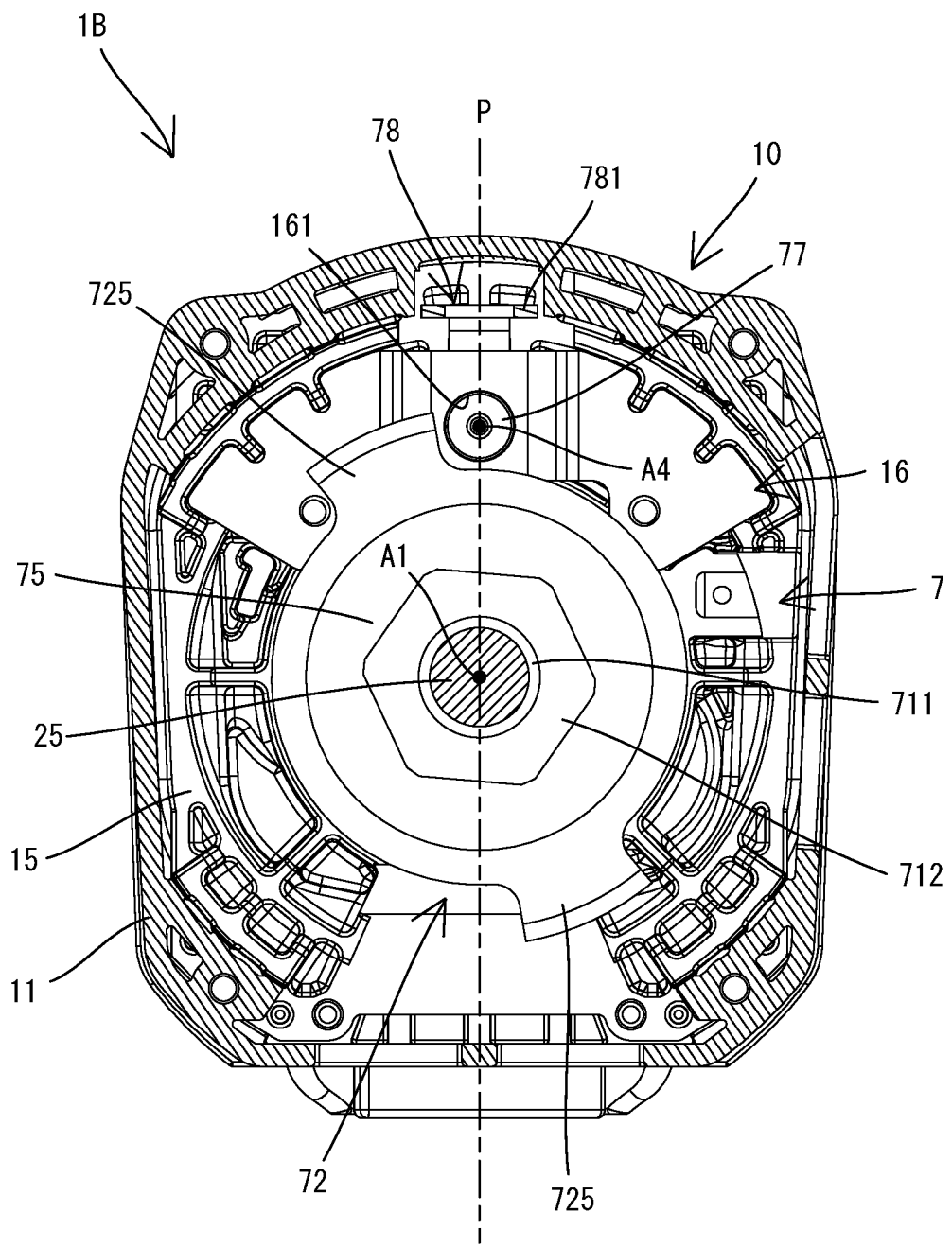
FIG. 9 is a sectional view taken along line IX-IX in FIG. 8, showing an initial state, in which a braking device is not activated.

As shown in FIGS. 7 to 9, the braking device 7 of the rotary hammer 1B is disposed between the fan 27 and the bearing 251 (the partition wall 15) in the extension direction of the motor shaft 25 (i.e., in the front-rear direction). Thus, the braking device 7 and motor body 20 are on opposite sides of the fan 27 in the extension direction of the motor shaft 25. The solenoid 8 is disposed directly above the motor 2 within the rear housing part 11.

The braking device 7 includes a first rotor 71, a second rotor 72, a biasing member 75, and a stopper 77.

The first rotor 71 is fixed to the motor shaft 25 between the fan 27 and the bearing 251. The first rotor 71 is configured to rotate integrally with the motor shaft 25 around the rotational axis A1. The first rotor 71 includes a sleeve 711 fixed around the motor shaft 25, and a disc part 715 extending radially outward from the sleeve 715. The first rotor 71 is made of metal (for example, iron).

The second rotor 72 is basically an annular member. The outer diameter of the second rotor 72 is larger than the outer diameter of the disc part 715 of the first rotor 71. A recess that substantially matches the disc part 715 is formed on a front surface of the second rotor 72. The second rotor 72 is disposed behind the first rotor 71 and fitted to an outer circumferential portion of the disc part 715 from the rear side. The second rotor 72 is made of metal (for example, iron). Two protrusions 725 are formed on the second rotor 72 and protrude radially outward. The two protrusions 725 have the same shape and are opposite to each other across the rotational axis A1 (diametrically opposite to each other).

The biasing member 75 is configured to bias and press the second rotor 72 against the first rotor 71. In this embodiment, the biasing member 75 is a disc spring, which can be accommodated in a small apace and which can exert a large load. The biasing member 75 is disposed between the second rotor 72 and a retaining ring 712 in the front-rear direction in a compressed manner. The retaining ring 712 is fixed around the sleeve 711 of the first rotor 71 behind the second rotor 72. A rear surface 717 of the outer circumferential portion of the disc part 715 of the first rotor 71 normally frictionally engages with a front surface 722 (a bottom surface of the recess) of the second rotor 72, owing to the biasing force of the biasing member 75. Thus, when the motor shaft 25 and the first rotor 71 rotate, the second rotor 72 also rotates. Similar to the first embodiment, a friction material may be fixed on one of the first rotor 71 and the second rotor 72.

The stopper 77 is operably coupled to the solenoid 8. The stopper 77 is configured to move (specifically, linearly move) in response to activation of the solenoid 8 and to thereby interfere with (come into contact with) the second rotor 72 to stop rotation of the second rotor 72. In this embodiment, the stopper 77 is a solid cylindrical pin. The stopper 77 is disposed such that its moving axis A4 extends parallel to the rotational axis A1 (i.e., extends in the front-rear direction).

A front portion of the stopper 77 is disposed within a guide hole 157 formed on the partition wall 15 to be slidable in the front-rear direction. A guide member 16 having a guide hole 161 is fixed to a rear surface of the partition wall 15. The guide hole 161 is formed in a portion of the guide member 16 that faces the guide hole 157 at the rear side of the guide hole 157. The stopper 77 is slidable in the front-rear direction in the guide hole 161. The guide holes 157 and 161 stably guide movement of the stopper 77 in the front-rear direction. The moving axis A4 of the stopper 77 intersects a moving path (track, course, route), along which the protrusion 725 moves (or an area through which the protrusion 725 passes) when the second rotor 72 rotates.

The structure for coupling the braking device 7 (the stopper 77) and the solenoid 8 is now described.

As shown in FIG. 8, the stopper 77 and the plunger 83 of the solenoid 8 are operably coupled via a connection member 78. The connection member 78 is a plate-like member bend to form an L-shape in a side view. The connection member 78 includes a first part 781 extending in the front-rear direction, and a second part 782 extending downward from a front end of the first part 781. A rear end portion of the first part 781 is connected to the front end portion of the plunger 83. A support hole 783 is formed in the second part 782. The stopper 77 is inserted into the support hole 783 and is supported by the connection member 78 such that the stopper 77 is slidable in the front-rear direction.

A flange 771 that extends radially outward is formed on a generally center portion of the stopper 77 in the front-rear direction (a portion that is always located outside the guide hole 157). The stopper 77 is inserted into the support hole 783 such that the flange 771 faces a rear surface of the second part 782. A biasing member 79 is disposed between the guide member 16 and the flange 771 in the front-rear direction. The biasing member 79 is a compression coil spring. The biasing member 79 is compressed and fitted around the stopper 77 such that its front end abuts on the flange 771 and its rear end abuts on the guide member 16. Thus, the stopper 77 is always biased by the biasing member 79 away from the guide member 16 (i.e., forward) and is held at a position where the flange 771 abuts on the rear surface of the second part 782.

In an initial state in which the solenoid 8 is not energized, the plunger 83 and the connection member 78 are located at their foremost positions within their respective movable ranges. Thus, the stopper 77 is also located at its foremost position within its movable range. At this time, the rear end of the stopper 77 is frontward of the second rotor 72 in the front-rear direction. Thus, the stopper 77 is not in (does not intersect) the moving path of the protrusions 725 of the second rotor 72. Accordingly, even when the second rotor 72 rotates, the stopper 77 does not physically interfere with (come into contact with, collide with, hit) the protrusions 725. In the following description, the foremost position of the stopper 77 (the position shown in FIG. 8) may be referred to as a non-interference position.

Figure 10:
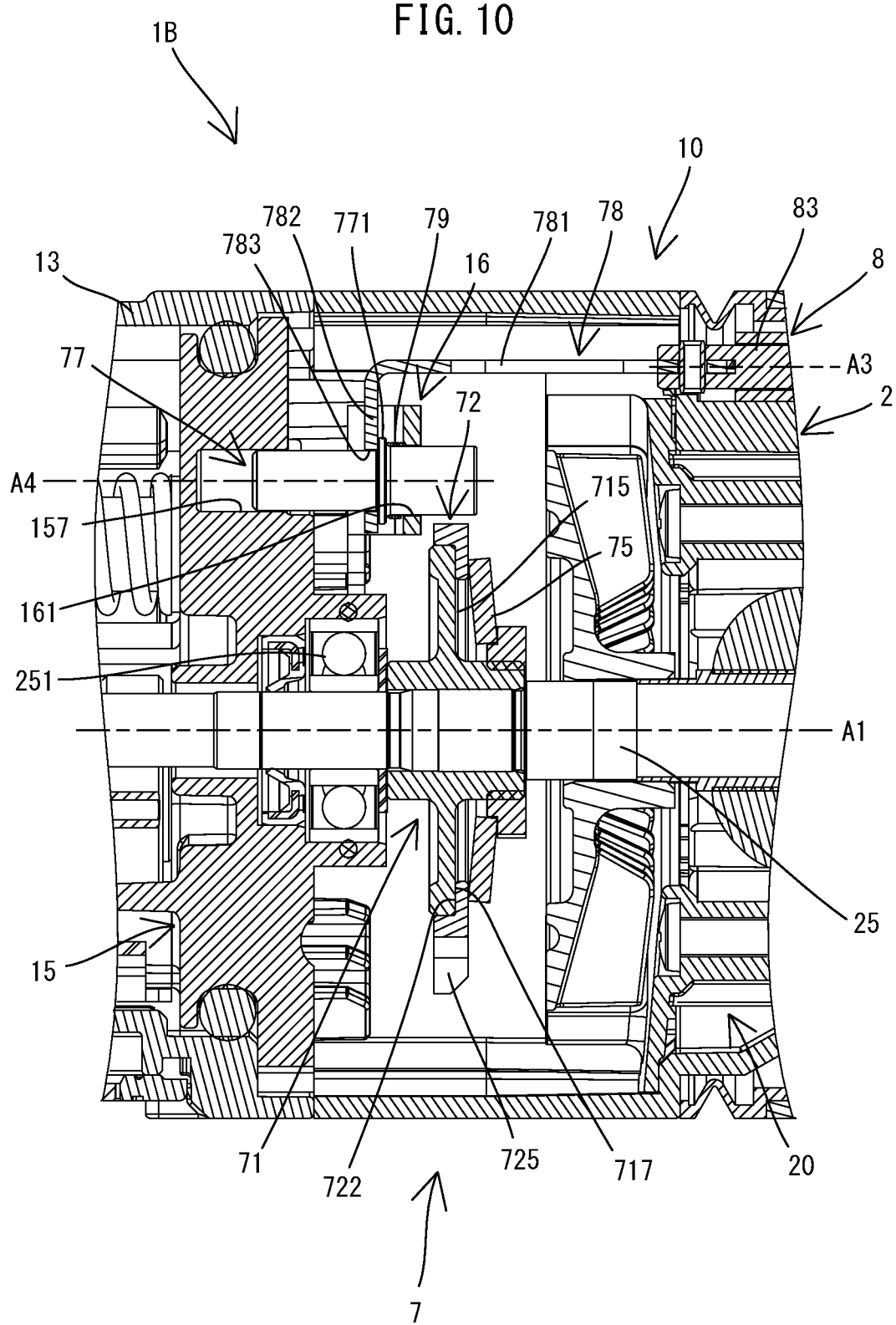
FIG. 10 is a sectional view, which corresponds to FIG. 9, showing a braking state, in which the braking device is activated.

When the coil of the solenoid 8 is energized, the plunger 83 linearly moves rearward along the moving axis A3. The connection member 78 linearly moves integrally with the plunger 83 and causes the stopper 77 to linearly move rearward along the moving axis A4 against the biasing force of the biasing member 79. As shown in FIG. 10, when the stopper 77 reaches its rearmost position within its movable range in response to the activation of the solenoid 8, the rear end of the stopper 77 is located rearward of the rear end of the second rotor 72 in the front-rear direction. When the stopper 77 is in (intersects) the moving path of the protrusion 725 and the second rotor 72 rotates, the stopper 77 physically interferes with (comes into contact with, collides with, hits) the protrusion 725. Accordingly, in the following description, the rearmost position of the stopper 77 (the position shown in FIG. 10) may be referred to as an interference position. When the stopper 77 comes into contact with one of the protrusions 725 of the second rotor 72 at the interference position, the stopper 77 stops rotation of the second rotor 72 to thereby brake the motor shaft 25 via the first rotor 71.

The operation of the rotary hammer 1B is now described.

When the trigger 171 is manually depressed and thus the switch 172 is turned ON, the control circuit 51 of the controller 5 energizes the motor 2 to start driving of the motor 2. The driving mechanism 4 is driven according to the selected action mode.

The control circuit 51 determines whether or not the spindle 3 is in the locking state while driving the motor 2, based on the acceleration (the signal from the acceleration sensor 53) detected by the acceleration sensor 53. When the control circuit 51 determines that the spindle 3 is in the locking state (i.e., when the control circuit 51 detects the locking state), the control circuit 51 stops energizing the motor 2, namely, stops driving the motor 2. In addition, the control circuit 51 activates the solenoid 8 at substantially the same time as the control circuit 51 stops energizing the motor 2 (or immediately before or immediately after the control circuit 51 stops energizing) so as to activate the braking device 7. As described above, the plunger 83 and the connection member 78 are pulled rearward and thus the stopper 77 is moved from the non-interference position to the interference position (see FIG. 10).

The rotor 23 and the motor shaft 25 of the motor 2 tend to keep rotating due to inertia even after the energizing of the motor 2 is stopped. To cope with this, the stopper 77 at the interference position comes into contact with the second rotor 72 (the protrusion 725) and immediately stops the rotation of the second rotor 72. When the second rotor 72 stops rotating, the first rotor 71 rotates together with the motor shaft 25 while its rotation speed is reduced owing to its slip engagement with the second rotor 72, and then stops rotating. In this embodiment, the impact force is caused by the contact (collision) between the stopper 77 and the second rotor 72 (the protrusion 725). To cope with this, a slip is caused between the second rotor 72 and the first rotor 71 integrated with the motor shaft 25, so that the impact force can be relaxed. The driving of the driving mechanism 4 is stopped when the motor shaft 25 stops rotating.

Thereafter, when the control circuit 51 stops energizing the solenoid 8, the plunger 83 returns to its foremost position. When the plunger 83 returns to its foremost position, the connection member 78 returns to its foremost position and the stopper 77 returns to the non-interference position from the interference position, owing to the biasing force of the biasing member 79 (see FIG. 8).

As described above, also in this embodiment, similar to the first embodiment, when the spindle 3 falls into the locking state for some reason, the braking device 7, which serves as a safety device, directly acts on and brakes the motor shaft 25 in response to the activation of the solenoid 8. Thus, the possibility of excessive rotation of the tool body 10 around the driving axis A2 due to the reaction torque can be reduced. The braking device 7 is configured to directly act on the motor shaft 25. Thus, the braking device 7 can brake the motor shaft 25 with smaller force to reduce the possibility of the excessive rotation of the tool body 10, compared to a known braking device that directly acts on the spindle 3. Also in this embodiment, the braking device 7 and the solenoid 8 are disposed within the rear housing part 11, and thus the braking device 7 and the solenoid 8 can be protected from the lubricant and the solenoid 8 and the braking device 7 (the stopper 77) can be easily coupled to each other.

Further, in this embodiment, the first rotor 71 and the second rotor 72 are normally pressed against each other by the biasing force of the biasing member 75 to be frictionally engaged with each other. Owing to the frictional engagement, the first rotor 71 and the second rotor 72 rotate integrally with each other and transmit torque. When the stopper 77 is moved from the non-interference position to the interference position in response to the detection of the locking state, the stopper 77 stops the rotation of the second rotor 72 to thereby brake the motor shaft 25 via the first rotor 71. In this embodiment, a rational braking system is achieved that can brake the motor shaft 25 by simply moving the stopper 77 in response to the activation of the solenoid 8. Further, the two protrusions 725, each of which is capable of interfering with the stopper 77 that is located at the interference position, are disposed opposite to each other across the rotational axis A1 (i.e., disposed at equal intervals in the circumferential direction). Owing to this arrangement, rotating imbalance of the second rotor 72 can be reduced and the second rotor 72 can be stopped immediately by the stopper 77.

Correspondences between the features of the second embodiment and the features of the present disclosure are as follows. However, the features of the embodiment are merely exemplary, and do not limit the features of the present disclosure or the present invention. The features that are substantially identical to those of the first embodiment are omitted below.

The rotary hammer 1B is an example of the "power tool". The braking device 7 is an example of the "braking device". The first rotor 71 is an example of the "first rotation member". The second rotor 72, the biasing member 75, and the stopper 77 are examples of the "second rotation member", the "second biasing member", and the "stopper", respectively. The biasing member 75 is an example of the "disc spring". The protrusion 725 is an example of the "interference part".

The above-described embodiments are merely exemplary embodiments of the present disclosure, and the power tool according to the present disclosure is not limited to the rotary hammers 1A and 1B of the above-described embodiments. For example, the following non-limiting modifications may be made. Further, at least one of these modifications may be employed in combination with at least one of the rotary hammers 1A and 1B of the above-described embodiments and the claimed features.

For example, the above-described embodiments exemplarily disclose the rotary hammers 1A and 1B, which are capable of performing the rotary action and the hammer action, as specific examples of a power tool having a final output shaft configured to be rotationally driven. However, the power tool according to the present disclosure may be embodied as an e.g., electric drill that is capable of performing only the rotary action or a fastening tool that is capable of fastening a nut and a bolt. Further, the power tool according to the present disclosure may be a rotary hammer (a hammer drill) having two action modes of the hammer mode and the rotary hammer mode.

Any one of the rotary hammers 1A and 1B may be configured to be driven by electric power supplied from a rechargeable battery, not from an external AC power source. In this case, a battery mounting part that is configured to removably receive the rechargeable battery may be provided, in place of the power cord 179, e.g., in the lower portion of the handle 17.

The motor 2 may be disposed such that the rotational axis A1 of the motor shaft 25 intersects the driving axis A2. The configuration of the tool body 10 may be changed according to the change in the arrangement of the motor 2. For example, the tool body 10 may be formed in an L-shape. The inner space of the tool body 10 need not necessarily be partitioned by the partition wall 15. Further, the inner space may be partitioned at a position different from those of the above-described embodiments. It is preferable that each of the braking devices 6 and 7 is disposed in a space without the lubricant, within the tool body 10.

The structure and position of the fan 27, and an air flow path (arrangements of the inlet openings and the discharge openings) within the tool body 10 may be different from those of the above-described embodiments. For example, the fan 27 may be disposed at the rear of the motor body 20. Further, for example, a fan that sucks air from two sides in its axial direction (front side and rear side) may be employed as the fan 27.

Each of the above-described embodiments describes an example in which the control circuit 51 of the controller 5 detects the locking state based on the acceleration detected by the acceleration sensor 53. However, any of the rotary hammers 1A and 1B may have the different type of detector that detects a rotating state of the tool body 10 around the driving axis A2. For example, a velocity sensor, an angular velocity sensor or an angular acceleration sensor, instead of the acceleration sensor 53, may be employed. Alternatively, any of the rotary hammers 1A and 1B may have a detector that detects a physical quantity or physical quantities (for example, a load applied to the tool accessory 91) that is different from the rotating state of the tool body 10, and the control circuit 51 may detect the locking state based on the detected physical quantity (quantities). The acceleration sensor 53 or other detector may be disposed separately (discretely) from the controller 5 (the control circuit 51). The control circuit 51 and the acceleration sensor 53 may be disposed not within the handle 17 but within the tool body 10.

The structure of each of the braking devices 6 and 7 (for example, the components, shape of each component, number and arrangement of the components) may be appropriately changed. For example, following modifications may be employed in any one of the braking devices 6 and 7.

A plurality of friction materials that are engageable with the front surface 617 of the brake rotor 61 may be attached to the brake member 63 of the braking device 6. Further, for example, the brake member or members 63 may be configured to move in a radial direction of the brake rotor 61. The brake rotor 61 and the brake member 63 may be configured such that tapered surfaces thereof, instead of the surfaces orthogonal to the rotational axis A1, frictionally engage with each other. The guide structure of the brake member 63 may be formed by a part (for example, an inner wall of the tool body 10), instead of the guide pin 151. The number of the guide pins 151 is not limited to four.

The number, and arrangement of the fulcrum protrusions 671 and/or the pressing protrusions 673 of the pressing member 67 are not limited to those in the above-described embodiments. The pressing member 67 need not necessarily include the fulcrum protrusion 671 and/or the pressing protrusion 673, as long as the pressing member 67 can press the brake member 63 against the brake rotor 61. For example, the pressing member 67 may be pivotably supported by a support shaft held by the tool body 10 (the rear housing part 11). The pressing member 67 may be configured to linearly move in the front-rear direction to press the brake member 63 against the brake rotor 61. Alternatively, the pressing member 67 may be omitted. For example, the brake member 63 may be operably coupled to the plunger 83 (the connection member 68) so as to move in response to the activation of the solenoid 8.

The first rotor 71 and the second rotor 72 of the braking device 7 may be configured such that tapered surfaces thereof, instead of the surfaces orthogonal to the rotational axis A1, frictionally engage with each other. The number of the protrusions 725 of the second rotor 72 may be one or more than three. However, in order to avoid rotating imbalance of the second rotor 72, it is preferable that the protrusions 725 are at equal intervals in the circumferential direction. A portion of the second rotor 72 other than the protrusion may interfere with (come into contact with) the stopper 77. For example, the stopper 77 may be configured to engage with an arc-shaped groove formed in the disc-shaped second rotor 72 to stop the rotation of the second rotor 72.

The stopper 77 may have a different shape (for example, a rectangular columnar shape), as long as the stopper 77 can interfere with (comes into contact with) the protrusion 725 at the interference position and thus stop the rotation of the second rotor 72. The stopper 77 may be formed by a portion of the connection member 78. The stopper 77 may be movable in a radial direction of the second rotor 72 between the interference position and the non-interference position. The guide structure of the stopper 77 may be formed by a portion other than the partition wall 15 and the guide member 16 (for example, the inner wall of the tool body 10).

Each of the connection members 68 and 78 may have a shape different from those in the above-described embodiment or may be formed by a plurality of members connected to each other. Each of the connection structure between the connection member 68 and the pressing member 67 and the connection structure between the connection member 78 and the stopper 77 may be different from those in the above-described embodiments.

Each of the biasing members 65 and 75 may be a spring (for example, a tension spring, or a torsion spring) different from those in the above-described embodiments or an elastic element (for example, elastomer) other than a spring. The number and position of each of the biasing members 65 and 75 may be different from those in the above-described embodiment.

The solenoid 8 may be a push-type solenoid, instead of the pull-type solenoid. In such a modification, for example, the brake member 63 (and the pressing member 67) of the braking device 6 may be disposed between the brake rotor 61 and the solenoid 8 in the front-rear direction. Further, the stopper 77 of the braking device 7 may be at its rearmost position where the stopper 77 is incapable of interfering with the protrusion 725 of the second rotor 72 in the initial state and may be moved to its foremost position where the stopper 77 is capable of interfering with the protrusion 725 in response to the activation of the solenoid 8. Further, a plurality of the solenoids 8 may be employed.

Further, in view of the nature of the present invention, the above-described embodiments, and the modifications thereof, the following Aspects can be provided. Any one of the following Aspects can be employed in combination with any one of the above-described embodiments, the above-described modifications and the claimed features.

(Aspect 1)

The braking device is a friction-type braking device that is configured to generate braking force by frictional engagement between components.

(Aspect 2)

At least a portion of the brake member that is configured to frictionally engage with the first rotation member comprises a friction material.

According to this Aspect, the brake member can brake the first rotation member efficiently. The friction material 636 is an example of the "friction material" in this Aspect.

(Aspect 3)

The power tool further comprises at least one guide that is configured to guide the brake member to be linearly movable between a spaced-apart position where the second surface is spaced apart from the first surface of the first rotation member and an abutting position where the second surface abuts on and frictionally engages with the first surface.

According to this Aspect, the brake member can move stably. The guide pin 151 is an example of the "guide" in this Aspect.

(Aspect 4)

The pressing member has a plurality of pressing protrusions that protrude toward the brake member to abut on the brake member.

The pressing protrusion 673 is an example of the "pressing protrusion" in this Aspect.

(Aspect 5)

An inner space of the tool body is partitioned by a partition wall into at least a first space in which the motor is disposed, and a second space in which the final output shaft and the transmission mechanism are disposed together with a lubricant, and
the braking device is disposed within the first space.

According to this Aspect, the motor body and the braking device can be securely isolated from the lubricant by the partition wall. The partition wall 15 is an example of the "partition wall" in this Aspect. The inner space of the rear housing part 11 is an example of the "first space" in this Aspect. The inner space of the front housing part 13 is an example of the "second space" in this Aspect.

(Aspect 6)

The partition wall supports a bearing that rotatably supports the motor shaft.

According to this Aspect, a rational structure can be realized by using the partition wall that partitions the inner space into the first space and the second space, as a support for the bearing. The bearing 251 is an example of the "bearing" in this Aspect.

(Aspect 7)

The solenoid is disposed within the first space.

According to this Aspect, the braking device and the solenoid are disposed together with the motor within the first space in which the lubricant is not needed. Thus, this configuration facilitates connecting between the solenoid and the braking device.

(Aspect 8)

The solenoid is intersected a straight line that is orthogonal to the first rotational axis and that intersects the motor body.

According to this Aspect, the solenoid is disposed radially outside the motor body. Thus, the solenoid and the braking device can be disposed in a relatively compact manner in the extension direction of the first rotational axis (the rotational axis of the motor shaft).

(Aspect 9)

The solenoid includes an actuation part that is configured to linearly move in parallel to the first rotational axis, and actuation part that is operably coupled to the braking device.

According to this Aspect, the solenoid can be disposed in a relatively compact manner in a radial direction of the motor body. The plunger 83 is an example of the "actuation part" in this Aspect.

(Aspect 10)

The actuation part is operably coupled to the pressing member and is configured to move the pressing member in response to activation of the solenoid.

(Aspect 11)

The actuation part is operably coupled to the stopper and is configured to move the stopper in response to activation of the solenoid.

(Aspect 12)

The stopper is configured to linearly move in parallel to the extension direction of the first rotational axis.

(Aspect 13)

The detection device is configured to detect the locking state based on a rotating state of the tool body around the second rotational axis.

When the final output shaft falls into the locking state, the tool body rotates around the second rotational axis. Thus, according to this Aspect, the detection device can appropriately detect the locking state.

(Aspect 14)

The power tool further comprises a detector that is configured to detect the rotating state of the tool body around the second rotational axis.

The acceleration sensor 53 is an example of the "detector" in this Aspect.

(Aspect 15)

The power tool further comprises a control device that is configured to activate the solenoid in response to the detection of the locking state.

The control circuit 51 of the controller 5 is an example of the "control device" in this Aspect.

(Aspect 16)

The first rotational axis and the second rotational axis are parallel to each other.

DESCRIPTION OF THE REFERENCE NUMERALS 1A, 1B: rotary hammer, 10: tool body, 11: rear housing part, 113: spring receiver, 13: front housing part, 131: barrel part, 15: partition wall, 151: guide pin, 153: recess, 155: stopper, 157: guide hole, 16: guide member, 161: guide hole, 17: handle, 171: trigger, 172: switch, 179: power cord, 2: motor, 20: motor body, 21: stator, 23: rotor, 25: motor shaft, 251: bearing, 252: bearing, 27: fan, 3: spindle, 32: tool holder, 33: cylinder, 4: driving mechanism, 41: striking mechanism, 413: piston, 415: impact bolt, 46: rotation transmitting mechanism, 461: driving gear, 463: driven gear, 5: controller, 51: control circuit, 53: acceleration sensor, 6: braking device, 61: brake rotor, 611: sleeve, 615: disc part, 617: front surface, 63: brake member, 631: receiving plate, 633: front surface, 634: protrusion, 635: guide hole, 636: friction material, 637: rear surface, 65: biasing member, 67: pressing member, 671: fulcrum protrusion, 673: pressing protrusion, 675: engagement hole, 68: connection member, 681: head, 7: braking device, 71: first rotor, 711: sleeve, 712: retaining ring, 715: disc part, 717: rear surface, 72: second rotor, 722: front surface, 725: protrusion, 75: biasing member, 77: stopper, 771; flange, 78: connection member, 781: first part, 782: second part, 783: support hole, 79: biasing member, 8: solenoid, 83: plunger, 91: tool accessory, A1: rotational axis, A2: driving axis, A3: moving axis, A4: moving axis, P: plane

What is claimed is:

1. A power tool comprising:
a motor that includes a motor body and a motor shaft, the motor body including a stator and a rotor, the motor shaft extending from the rotor and being rotatable around a first rotational axis;
a final output shaft that is configured to be rotationally driven around a second rotational axis by torque transmitted from the motor shaft;
a tool body that houses the motor and the final output shaft;
a detection device that is configured to detect a locking state of the final output shaft; and
a mechanical braking device that is configured to directly act on the motor shaft to frictionally brake the motor shaft in response to detection of the locking state, wherein:
the braking device comprises a first rotation member that is fixed to the motor shaft such that the first rotation member rotates integrally with the motor shaft, and
the braking device further comprises:
a brake member that is configured to frictionally engage with the first rotation member to brake the motor shaft;
at least one first biasing member that is configured to bias the brake member away from the first rotation member; and
a pressing member that is (i) a separate member from the brake member, and (ii) configured to press the brake member against the first rotation member, against biasing force of the at least one first biasing member by moving the pressing member toward the brake member, in response to the detection of the locking state.

2. The power tool as defined in claim 1, further comprising a transmission mechanism that is configured to transmit the torque of the motor shaft to the final output shaft,
wherein the braking device is disposed between the motor and the transmission mechanism in a power transmission path.

3. The power tool as defined in claim 1, further comprising a fan,
wherein:
the fan is disposed between the motor body and the braking device in an extension direction of the first rotational axis,
the fan is configured to rotate integrally with the motor shaft, and
the fan is configured to generate an air flow for cooling the motor body and the braking device.

4. The power tool as defined in claim 1, further comprising a solenoid that is operably coupled to the braking device,
wherein the solenoid is configured to be activated in response to the detection of the locking state to activate the braking device.

5. The power tool as defined in claim 4, further comprising a transmission mechanism that is configured to transmit the torque of the motor shaft to the final output shaft,
wherein:
an inner space of the tool body is partitioned into at least a first space and a second space,
the motor, the braking device and the solenoid are disposed in the first space, and
the final output shaft and the transmission mechanism are disposed in the second space together with a lubricant.

6. The power tool as defined in claim 1, wherein the motor is a brushed motor.

7. The power tool as defined in claim 1, further comprising a solenoid that is operably coupled to the pressing member of the braking device,
wherein the solenoid is configured to be activated in response to the detection of the locking state and is configured to move the pressing member in a direction in which the pressing member presses the brake member against the first rotation member.

8. The power tool as defined in claim 1, wherein:
the first rotation member has a first surface,
the brake member has a second surface that is frictionally engageable with the first surface of the first rotation member, and
the pressing member is configured to pivot about a fulcrum to linearly move the brake member relative to the first rotation member in a state in which the first surface and the second surface are substantially parallel to each other.

9. The power tool as defined in claim 8, further comprising at least one guide that is configured to guide the brake member to be linearly movable between a spaced-apart position at which the second surface is spaced apart from the first surface of the first rotation member and an abutting position at which the second surface abuts on and frictionally engages with the first surface.

10. The power tool as defined in claim 9, wherein the pressing member has at least one pressing protrusion that protrudes toward the brake member and abuts on the brake member.

11. The power tool as defined in claim 1, further comprising a solenoid that is operably coupled to the braking device, wherein:

the solenoid is configured to be activated in response to the detection of the locking state to activate the braking device, and the solenoid includes an actuation part that is (i) configured to linearly move in parallel to the first rotational axis, and (ii) operably coupled to the braking device.

12. The power tool as defined in claim 8, wherein the pressing member is configured to pivot about an axis that extends in a direction that is orthogonal to the first rotational axis.

13. A power tool comprising:

a motor that includes a motor body and a motor shaft, the motor body including a stator and a rotor, the motor shaft extending from the rotor and being rotatable around a first rotational axis;

a final output shaft that is configured to be rotationally driven around a second rotational axis by torque transmitted from the motor shaft;

a tool body that houses the motor and the final output shaft;

a detection device that is configured to detect a locking state of the final output shaft; and a mechanical braking device that is configured to directly act on the motor shaft to frictionally brake the motor shaft in response to detection of the locking state, wherein:

the braking device comprises a first rotation member that is fixed to the motor shaft such that the first rotation member rotates integrally with the motor shaft, and the braking device further comprises:

a second rotation member that is configured to rotate around the first rotational axis in response to rotation of the motor shaft and the first rotation member while frictionally engaging with the first rotation member, at least one biasing member that is configured to bias the second rotation member toward the first rotation member to frictionally engage the second rotation member with the first rotation member, and a stopper that is configured to be normally held at a first position where the stopper is incapable of interfering with the second rotation member, and that is configured to move, in response to the detection of the locking state, to a second position where the stopper is capable of interfering with the second rotation member to stop rotation of the second rotation member.

14. The power tool as defined in claim 13, further comprising a solenoid that is operably coupled to the stopper of the braking device, wherein the solenoid is configured to be activated in response to the detection of the locking state and is configured to move the stopper from the first position to the second position.

15. The power tool as defined in claim 14, wherein:

the solenoid includes an actuation part that is operably coupled to the stopper and that is configured to linearly move in parallel to the first rotational axis, and the stopper is configured to linearly move in parallel to the first rotational axis.

16. The power tool as defined in claim 13, wherein:

the second rotation member has a plurality of interference parts arranged at equal intervals in a circumferential direction of the first rotational axis, and the stopper is configured to come into contact with any one of the interference parts to stop the rotation of the second rotation member.

17. The power tool as defined in claim 13, wherein the at least one biasing member comprises at least one disc spring.

* * * * *